(12) United States Patent
Patil et al.

(10) Patent No.: US 12,315,159 B2
(45) Date of Patent: May 27, 2025

(54) IMAGE PROCESSING FOR STROKE CHARACTERIZATION

(71) Applicant: KONINKLIJKE PHILIPS N.V., Eindhoven (NL)

(72) Inventors: Ravindra Patil, Bangalore (IN); Shreya Anand, Bangalore (IN); Sudipta Chaudhury, Bangalore (IN); Nagaraju Bussa, Bangalore (IN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 384 days.

(21) Appl. No.: 17/637,833

(22) PCT Filed: Aug. 24, 2020

(86) PCT No.: PCT/EP2020/073614
§ 371 (c)(1),
(2) Date: Feb. 24, 2022

(87) PCT Pub. No.: WO2021/037790
PCT Pub. Date: Mar. 4, 2021

(65) Prior Publication Data
US 2022/0284578 A1    Sep. 8, 2022

(30) Foreign Application Priority Data
Aug. 29, 2019   (EP) .................................. 19194438

(51) Int. Cl.
*G06T 7/00*     (2017.01)
*G06T 7/11*     (2017.01)

(52) U.S. Cl.
CPC .............. *G06T 7/0014* (2013.01); *G06T 7/11* (2017.01); *G06T 2207/20081* (2013.01); *G06T 2207/20084* (2013.01); *G06T 2207/30008* (2013.01); *G06T 2207/30016* (2013.01)

(58) Field of Classification Search
CPC ........ G06V 20/41; G06V 20/20; G06F 1/163; G06F 18/214
See application file for complete search history.

(56) References Cited

U.S. PATENT DOCUMENTS

| 5,570,404 A | 10/1996 | Liang |
| 7,734,009 B2 | 6/2010 | Brunner |

(Continued)

FOREIGN PATENT DOCUMENTS

| JP | 2000237176 A | 9/2000 |
| JP | 2009050413 A | 3/2009 |

(Continued)

OTHER PUBLICATIONS

PCT International Search Report, International application No. PCT/EP2020/073614, Oct. 5, 2020.

(Continued)

*Primary Examiner* — Md K Talukder

(57) ABSTRACT

The invention discloses an apparatus for stroke characterization. The apparatus comprises a processor. The processor is configured to receive image data representing a three-dimensional image of a head of a subject; identify a region within the image data corresponding to bone in the head of the subject; apply an adjustment to the image data to compensate for effects resulting from radiation scattered from the bone during acquisition of the image data; generate a two-dimensional image based on the adjusted image data; and provide the generated two-dimensional image as an input to a predictive model to identify a region of interest for stroke characterization in the two-dimensional image.

16 Claims, 8 Drawing Sheets

(56) References Cited

U.S. PATENT DOCUMENTS

| | | | |
|---|---|---|---|
| 7,856,133 | B2 | 12/2010 | Nukui |
| 9,159,127 | B2 | 10/2015 | Meetz |
| 10,198,669 | B2 | 2/2019 | Kitamura |
| 2011/0037291 | A1 | 2/2011 | Pickering |
| 2014/0193053 | A1* | 7/2014 | Kadoury ............. A61B 90/36 382/128 |
| 2016/0364862 | A1* | 12/2016 | Reicher ............. G06F 3/0482 |
| 2018/0365824 | A1* | 12/2018 | Yuh ............. A61B 6/032 |
| 2020/0065940 | A1* | 2/2020 | Tang ............. G06T 3/40 |
| 2022/0284578 | A1* | 9/2022 | Patil ............. G06T 7/11 |

FOREIGN PATENT DOCUMENTS

| | | |
|---|---|---|
| WO | WO2012105907 A1 | 8/2012 |
| WO | WO2017106645 A1 | 6/2017 |
| WO | WO2019051271 A1 | 3/2019 |

OTHER PUBLICATIONS

Onnia V. et al., "Scatter Compensation in Digital Radiography", 2000 10th European Signal Processing Conference, IEEE, Sep. 4, 2000 (Sep. 4, 2000), pp. 1-4, XP032756109.

Gong T. et al., "Classification of CT Brain Images of Head Trauma", International Conference on Financial Cryptography and Data Security; [Lecture Notes in Computer Science; Lect. Notes Computer], Springer, Berlin, Heidelberg, pp. 401-408, Oct. 1, 2007, XP047467771.

Chilamkurthy S. et al., "Development and Validation of Deep Learning Algorithms for Detection of Critical Findings in Head CT Scans", Computer Vision and Pattern Recognition (cs.CV), Lancet, 1;392 (10162):2388-2396.2018.

Stib M.T. et al., "Deep Learning in Emergent Large Vessel Occlusion Detection Using Maximum Intensity Projections via CT Angiography", 2018 SIIM Conference on Machine Intelligence in Medical Imaging, Sep. 2018.

Kim H.C. et al., "Machine Learning Application for Rupture Risk Assessment in Small-Sized Intracranial Aneurysm", Journal of Clinical Medicine, 8(5), 683, 2019.

Nakao T. et al., "Deep Neural Network-Based Computer-Assisted Detection of Cerebral Aneurysms in MR Angiography", Journal of . Magnetic Resonance Imaging, vol. 47, pp. 948-953, Apr. 2018.

Venema H.W. et al., "CT Angiography of the Circle of Willis and Intracranial Internal Carotid Arteries: Maximum Intensity Projection with Matched Mask Bone Elimination—Feasibility Study1", Radiology, vol. 218, pp. 893-898, Mar. 2001.

Stember J.N. et al., "Convolutional Neural Networks for the Detection and Measurement of Cerebral Aneurysms on Magnetic Resonance Angiography", Journal of Digital Imaging, Society for Imaging Informatics in Medicine, vol. 32, No. 5, pp. 808-815, 2019.

\* cited by examiner

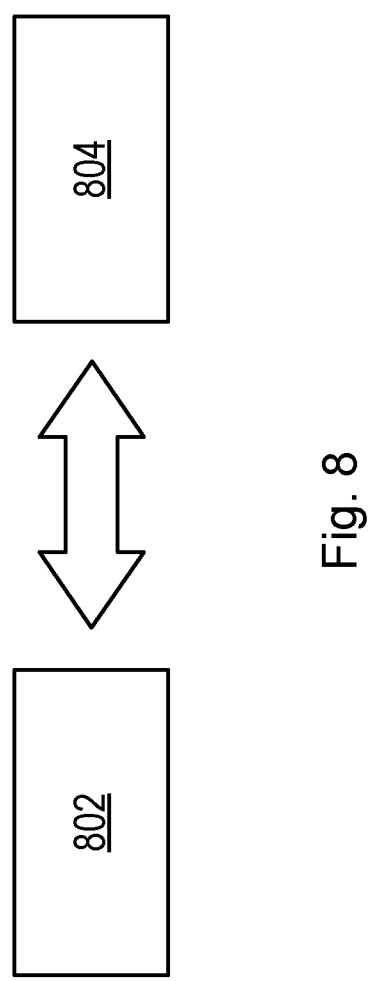

IMAGE PROCESSING FOR STROKE CHARACTERIZATION

CROSS-REFERENCE TO PRIOR APPLICATIONS

This application is the U.S. National Phase application under 35 U.S.C. § 371 of International Application No. PCT/EP2020/073614, filed on Aug. 24, 2020, which claims the benefit of European Application No. 19194438.8, filed on Aug. 29, 2019. These applications are hereby incorporated by reference herein.

FIELD OF THE INVENTION

The invention relates to stroke characterization and, more particularly, to image processing for identifying a region of interest for stroke characterization. An apparatus is disclosed, along with a method for stroke characterization and a computer program product.

BACKGROUND OF THE INVENTION

A stroke is a medical condition in which poor blood flow to a person's brain results in cell death. Two main types of stroke may occur: ischemic, due to a lack of blood flow, and hemorrhagic, due to bleeding. A patient who suffers from a hemorrhagic stroke may also suffer an intracerebral hemorrhage (ICH), also known as cerebral bleed, which is a type of intracranial bleed that occurs within the brain tissue or ventricles of a person. The type of treatment to be provided to a person who has suffered a stroke depends on the type of stroke, the cause of the stroke and the portion of the brain that is affected. Typically, a person who has suffered a stroke will be treated using medication, such as medicine to prevent and dissolve blood clots, or medicine to reduce bleeding. In some cases, surgery may also be required to treat a person who has suffered a stroke.

Every minute that a stroke goes untreated can result in the death of around 2 million neurons in the brain, resulting in part of the brain is not functioning properly. The sooner a person receives treatment for a stroke, the less damage to the brain is likely to occur. Therefore, it is desirable to detect the occurrence of a stroke as quickly as possible. For example, it would be desirable to be able to detect and characterize (e.g. understand the type of stroke, the location of the stroke and the cause of the stroke) early on in a patient's encounter with a medical facility (e.g. in an emergency room); by diagnosing a stroke quickly, the necessary treatment of the patient can be started quickly, giving the patient a more favorable medical outcome.

SUMMARY OF THE INVENTION

The inventors of the present invention have recognized the need to be able to provide a fast and reliable diagnosis in respect of a patient exhibiting potential symptoms of a stroke. Accordingly, this invention provides a mechanism by which three-dimensional image data can be used for stroke characterization. More specifically, the three-dimensional image data (e.g. a three-dimensional scan of a patient's head) can be pre-processed such that it can be provided as an input to a predictive model (e.g. a machine learning model) trained to identify a region of interest that may be relevant for and used for stroke detection and characterization. The pre-processing performed in respect of the three-dimensional image data effectively cleans up the image data, and converts the three-dimensional image into a two-dimensional image, while retaining much, if not all, of the detail used to detect and characterize the stroke.

According to a first aspect, the invention provides an apparatus for stroke characterization, the apparatus comprising a processor configured to receive image data representing a three-dimensional image of a head of a subject; identify a region within the image data corresponding to bone in the head of the subject; apply an adjustment to the image data to compensate for effects resulting from radiation scattered from the bone during acquisition of the image data; generate a two-dimensional image based on the adjusted image data; and provide the generated two-dimensional image as an input to a predictive model to identify a region of interest for stroke characterization in the two-dimensional image.

By processing the image data in this way (i.e. by adjusting the image data to compensate for radiation scattering from bone), the predictive model can analyze the image data more effectively, and produce a more accurate output. Specifically, any increases in pixel intensity in the image data resulting from radiation scattering can be compensated for (reduced or removed) to reduce the likelihood that the predictive model will misconstrue or mischaracterize the pixel intensity as relating to a hemorrhage in the brain. As a consequence, the likelihood of a false-positive characterization (e.g. stroke diagnosis) is reduced.

By performing a maximum intensity projection on the three-dimensional image data, it is possible to generate a two-dimensional image which retains detail from the three-dimensional image that might be used to detect and/or characterize a stroke in the image data. Furthermore, by processing the three-dimensional data prior to performing the maximum intensity projection, only the most relevant parts of the image data are analyzed, leading to a high accuracy of prediction (e.g. identifying a region of interest). The combination of the processing and the maximum intensity projection mean that any regions of interest, such as a hemorrhage event, are clearly visible and identifiable in the generated two-dimensional image, so that an output of the predictive model may be regularly checked and confirmed by a medical professional.

In some embodiments, the processor may be further configured to register of the image data to a three-dimensional representation of a brain using a plurality of fiducial landmarks common to the image data and the three-dimensional representation.

The processor may, in some embodiments, be configured to identify a portion of the image data corresponding to a boundary of the subject's brain by, for each of a plurality of successive slices of the image data, applying a mask to remove the region of the image data corresponding to bone; defining a boundary around the region of the image data corresponding to bone; identifying, within the bounded region, a sub-region of the image data having the largest number of contiguous pixels; and determining that the identified sub-region of the image data corresponds to the subject's brain.

In some embodiments, the processor may be configured to identify a portion of the image data corresponding to a lower boundary of the subject's brain by analyzing successive slices of the image data progressing through the head to determine a measure of brain visible in each slice; and responsive to determining that a change in the measure of brain visible in a particular slice relative to a measure of brain visible in the slice immediately preceding the particular slice is below a defined threshold, determining that the particular slice includes image data corresponding to a lower boundary of the subject's brain.

The processor may, in some embodiments, be configured to generate a two-dimensional image based on the image data by: performing a maximum intensity projection of the image data through at least one of a coronal plane, an axial plane and a sagittal plane.

In some embodiments, the processor may be further configured to obtain, as an output of the predictive model, an indication of the identified region of interest; and generate a bounding box for presentation around the region of interest in a representation of the brain of the subject.

In some embodiments, the region of interest may comprise a region where a hemorrhage has occurred. The processor may be further configured to calculate (e.g. automatically), based on an output of the predictive model, a score indicative of the severity of the hemorrhage.

The image data may, in some embodiments, comprise data acquired using a non-contrast computed tomography imaging modality.

In some embodiments, the predictive model may comprise a convolutional neural network trained to determine whether or not the identified region of interest is indicative of a hemorrhage event.

In some embodiments, the adjustment applied to the image data may comprise a reduction of a pixel intensity in regions corresponding to regions of the subject's head into which the radiation is scattered from the bone during acquisition of the image data. For example, the adjustment may comprise adjusting the pixel intensity according to the formula:

$$y = \frac{\left(\sqrt{\frac{2}{\pi} \cdot e^{\left(-\frac{1}{2x^2}\right)}}\right)}{x^3},$$

where y is the pixel intensity, and where x is the distance from a surface of the bone in millimeters.

According to a second aspect, the invention provides a method for stroke characterization in medical image data, the method comprising receiving image data representing a three-dimensional image of a head of a subject; identifying a region within the image data corresponding to bone in the head of the subject; applying an adjustment to the image data to compensate for effects resulting from radiation scattered from the bone during acquisition of the image data; generating a two-dimensional image based on the adjusted image data; and providing the generated two-dimensional image as an input to a predictive model to identify a region of interest for stroke characterization in the two-dimensional image.

According to a third aspect, the invention provides a method of processing image data for use in stroke characterization, the method comprising preparing a training dataset by, for each of a plurality of subjects: receiving three-dimensional image data representing a subject's head; and pre-processing the three-dimensional image data by: applying an adjustment to the three-dimensional image data to compensate for effects resulting from radiation scattered from the bone during acquisition of the three-dimensional image data; and generating a two-dimensional image based on the three-dimensional image data.

In some embodiments, the method may further comprise training, using the training dataset, a predictive model to identify in the two-dimensional image a region of interest for stroke characterization.

According to a fourth aspect, the invention provides a computer program product comprising a non-transitory computer-readable medium, the computer-readable medium having computer-readable code embodied therein, the computer-readable code being configured such that, on execution by a suitable computer or processor, the computer or processor is caused to perform steps of the methods disclosed herein.

These and other aspects of the invention will be apparent from and elucidated with reference to the embodiments described hereinafter.

BRIEF DESCRIPTION OF THE DRAWINGS

For a better understanding of the invention, and to show more clearly how it may be carried into effect, reference will now be made, by way of example only, to the accompanying drawings, in which:

FIG. 8 is a schematic illustration of a computer-readable medium in communication with a processor.

DETAILED DESCRIPTION OF EMBODIMENTS

Examples described herein provide apparatuses and methods that can be used to characterize stroke in medical images. A three-dimensional image of a subject's head may be acquired, for example using known medical imaging techniques, and processed as described herein so that the processed image may be provided as an input to a trained predictive model (e.g. neural network, or a deep leaning model) for analysis, to detect and/or characterize signs indicative that the subject has suffered a stroke. By processing the three-dimensional data in the manner disclosed herein, the data provided to the trained predictive model is "cleaner", and more likely to yield a highly accurate output. The ability to obtain an accurate output is particularly important in the medical sector, where a quick diagnosis means that appropriate action can be taken in a timely manner. According to various embodiments disclosed herein, the invention also provides a method of processing image data for use in stroke characterization, such as preparing a training dataset which can be used to train a predictive model for stroke characterization.

Figure 1:
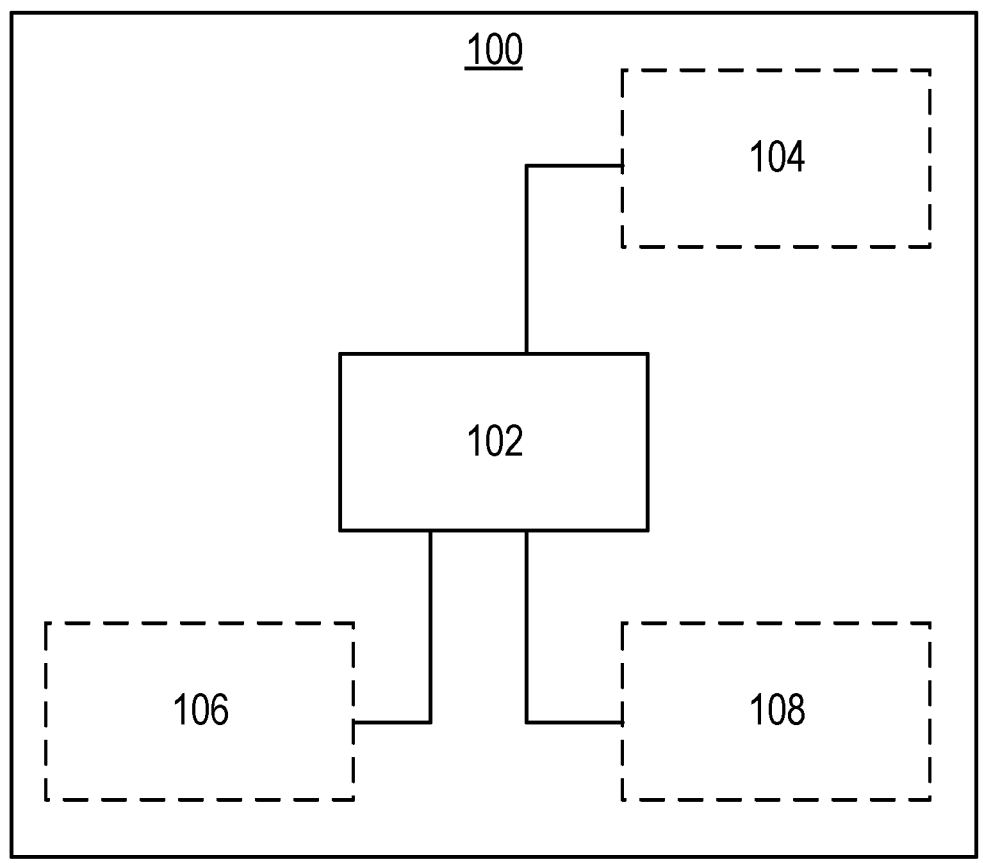
FIG. 1 is a schematic illustration of an example of an apparatus according to various embodiments disclosed herein.

FIG. 1 shows a block diagram of an apparatus 100 according to an embodiment that can be used for stroke characterization. For example, the apparatus 100 may be used for processing data to be used for stroke identification or stroke characterization. With reference to FIG. 1, the apparatus 100 comprises a processor 102 that controls the operation of the apparatus 100 and that can implement the methods described herein.

The apparatus 100 may further comprise a memory 106 comprising instruction data representing a set of instructions. The memory 106 may be configured to store the instruction data in the form of program code that can be executed by the processor 102 to perform the method described herein. In some implementations, the instruction data can comprise a plurality of software and/or hardware modules that are each configured to perform, or are for performing, individual or multiple steps of the method described herein. In some embodiments, the memory 106 may be part of a device that also comprises one or more other components of the apparatus 100 (for example, the processor 102 and/or one or more other components of the apparatus 100). In alternative embodiments, the memory 106 may be part of a separate device to the other components of the apparatus 100.

In some embodiments, the memory 106 may comprise a plurality of sub-memories, each sub-memory being capable of storing a piece of instruction data. In some embodiments where the memory 106 comprises a plurality of sub-memories, instruction data representing the set of instructions may be stored at a single sub-memory. In other embodiments where the memory 106 comprises a plurality of sub-memories, instruction data representing the set of instructions may be stored at multiple sub-memories. For example, at least one sub-memory may store instruction data representing at least one instruction of the set of instructions, while at least one other sub-memory may store instruction data representing at least one other instruction of the set of instructions. Thus, according to some embodiments, the instruction data representing different instructions may be stored at one or more different locations in the apparatus 100. In some embodiments, the memory 106 may be used to store information, data (e.g. image data), signals and measurements acquired or made by the processor 102 of the apparatus 100 or from any other components of the apparatus 100.

The processor 102 of the apparatus 100 can be configured to communicate with the memory 106 to execute the set of instructions. The set of instructions, when executed by the processor 102 may cause the processor 102 to perform the method described herein. The processor 102 can comprise one or more processors, processing units, multi-core processors and/or modules that are configured or programmed to control the apparatus 100 in the manner described herein. In some implementations, for example, the processor 102 may comprise a plurality of (for example, interoperated) processors, processing units, multi-core processors and/or modules configured for distributed processing. It will be appreciated by a person skilled in the art that such processors, processing units, multi-core processors and/or modules may be located in different locations and may perform different steps and/or different parts of a single step of the method described herein.

Returning to FIG. 1, in some embodiments, the apparatus 100 may comprise at least one user interface 104. In some embodiments, the user interface 104 may be part of a device that also comprises one or more other components of the apparatus 100 (for example, the processor 102, the memory 106 and/or one or more other components of the apparatus 100). In alternative embodiments, the user interface 104 may be part of a separate device to the other components of the apparatus 100.

A user interface 104 may be for use in providing a user of the apparatus 100 (for example, a medical professional such as a radiologist, or any other user) with information resulting from the method according to embodiments herein. The set of instructions, when executed by the processor 102 may cause processor 102 to control one or more user interfaces 104 to provide information resulting from the method according to embodiments herein. Alternatively or in addition, a user interface 104 may be configured to receive a user input. In other words, a user interface 104 may allow a user of the apparatus 100 to manually enter instructions, data, or information. The set of instructions, when executed by the processor 102 may cause processor 102 to acquire the user input from one or more user interfaces 104.

A user interface 104 may be any user interface that enables rendering (or output or display) of information, data or signals to a user of the apparatus 100. Alternatively or in addition, a user interface 104 may be any user interface that enables a user of the apparatus 100 to provide a user input, interact with and/or control the apparatus 100. For example, the user interface 104 may comprise one or more switches, one or more buttons, a keypad, a keyboard, a mouse, a mouse wheel, a touch screen or an application (for example, on a tablet or smartphone), a display screen, a graphical user interface (GUI) or other visual rendering component, one or more speakers, one or more microphones or any other audio component, one or more lights, a component for providing tactile feedback (e.g. a vibration function), or any other user interface, or combination of user interfaces.

In some embodiments, as illustrated in FIG. 1, the apparatus 100 may also comprise a communications interface (or circuitry) 108 for enabling the apparatus 100 to communicate with interfaces, memories and/or devices that are part of the apparatus 100. The communications interface 108 may communicate with any interfaces, memories and devices wirelessly or via a wired connection.

It will be appreciated that FIG. 1 only shows the components required to illustrate this aspect of the disclosure and, in a practical implementation, the apparatus 100 may comprise additional components to those shown. For example, the apparatus 100 may comprise a battery or other power supply for powering the apparatus 100 or means for connecting the apparatus 100 to a mains power supply.

The apparatus 100 may be used for stroke characterization. More specifically, the apparatus 100 may be used for processing image data (e.g. medical image data) and, as such, may be referred to as a medical image processing apparatus. According to embodiments disclosed herein, the processor 102 is configured to receive image data representing a three-dimensional image of a head of a subject. While, in some examples, the image data may represent the subject's entire head, in other examples, the image data may represent just a portion of the subject's head. Typically, for stroke characterization, the subject's brain (or at least a substantial portion thereof) is imaged, so that events occurring within the brain, which may be indicative of the occurrence of a stroke, can be detected and analyzed.

The image data may, for example, comprise data acquired using a non-contrast computed tomography imaging modality. Example, the image data may comprise three-dimensional (e.g. volume) image data acquired from a non-contrast computed tomography (CT) scan. In one example, a low-dose computed tomography (low-dose CT or LD CT) imaging modality may be used to acquire the image data. In other examples, other imaging modalities may be used to acquire the three-dimensional image data. In general, imaging modalities involve directing electromagnetic radiation towards a subject to be imaged, and detecting the interaction of the electromagnetic radiation with the subject. The type of radiation used typically depends on the imaging modality.

The processor 102 is configured to identify a region within the image data corresponding to bone in the head of the subject. The region within the image data corresponding to bone may comprise a region that corresponds to the skull or a part of the skull of the subject.

Once the processor 102 has identified a region in the image data corresponding to bone, the processor 102 is configured to apply an adjustment to the image data to compensate for effects resulting from radiation scattered from the bone during acquisition of the image data. As noted, above, electromagnetic radiation is directed towards the subject during imaging. The behavior of the radiation (e.g. absorption by material in the subject's head) during imaging enables the subject to be imaged. However, when the radiation encounters bone (e.g. the skull), it reflects and scatters from the surface of the bone. The scattered radiation is detected by the imaging device, and the scattered radiation may be visible in the image data. The scattered radiation (or the visible effects thereof) may obscure other objects in subject's head, making it difficult to clearly see objects or events occurring within the subject's brain. Moreover, effects of scattered radiation (e.g. its appearance in an image of a subject's brain) may be similar to characteristic events that are indicative of a stroke. Thus, in an image (e.g. a 3D scan) of a subject's brain, radiation scattered from an inner surface of the skull may appear as an event (e.g. a hemorrhage event) associated with a stroke, leading to a misdiagnosis, such as false determination that the subject has suffered a stroke. The adjustment applied to the image data is therefore intended to compensate for the scattered radiation, such that an event (e.g. an increase in intensity of a group of pixels in an image) is not misconstrued as an event characteristic of a stroke.

The processor 102 is further configured to generate a two-dimensional image based on the adjusted image data. In some embodiments, as discussed in more detail below, this may be done by performing a maximum intensity projection of the adjusted three-dimensional image data.

The processor 102 is further configured to provide the generated two-dimensional image as an input to a predictive model to identify a region of interest for stroke characterization in the two-dimensional image. The predictive model may comprise a model to be executed using the processor 102. Alternatively, a different processor (e.g. a processor external to, and/or remote from, the apparatus 100 may be used to execute the predictive model. The predictive model, which may comprise an artificial neural network or classifier (discussed in greater detail below) may be trained to analyze the two-dimensional input image in order to identify, based on a set of features, part of the image (i.e. a region of interest) which is relevant for stroke characterization. For example, the predictive model may be trained to identify a region in the image that is indicative of a hemorrhage. Such a region in the image may not be easily identifiable by a human (e.g. a radiologist), but may be more identifiable using a trained predictive model.

In some examples, the predictive model may comprise an artificial neural network. Artificial neural networks or, simply, neural networks, and other machine learning models, will be familiar to those skilled in the art, but in brief, a neural network is a type of model that can be used to classify data (for example, classify, or identify the contents of image data). The structure of a neural network is inspired by the human brain. Neural networks are comprised of layers, each layer comprising a plurality of neurons. Each neuron comprises a mathematical operation. In the process of classifying a portion of data, the mathematical operation of each neuron is performed on the portion of data to produce a numerical output, and the outputs of each layer in the neural network are fed into the next layer sequentially. Generally, the mathematical operations associated with each neuron comprise one or more weights that are tuned during the training process (e.g. the values of the weights are updated during the training process to tune the model to produce more accurate classifications).

For example, in a neural network model for classifying the contents of images, each neuron in the neural network may comprise a mathematical operation comprising a weighted linear sum of the pixel (or in three dimensions, voxel) values in the image followed by a non-linear transformation. Examples of non-linear transformations used in neural networks include sigmoid functions, the hyperbolic tangent function and the rectified linear function. The neurons in each layer of the neural network generally comprise a different weighted combination of a single type of transformation (e.g. the same type of transformation, sigmoid etc. but with different weightings). As will be familiar to the skilled person, in some layers, the same weights may be applied by each neuron in the linear sum; this applies, for example, in the case of a convolution layer. The weights associated with each neuron may make certain features more prominent (or conversely less prominent) in the classification process than other features and thus adjusting the weights of neurons in the training process trains the neural network to place increased significance on specific features when classifying an image. Generally, neural networks may have weights associated with neurons and/or weights between neurons (e.g. that modify data values passing between neurons).

As briefly noted above, in some neural networks, such as convolutional neural networks, lower layers such as input or hidden layers in the neural network (i.e. the layers towards the beginning of the series of layers in the neural network) are activated by (i.e. the their output depends on) small features or patterns in the portion of data being classified, while higher layers (i.e. the layers towards the end of the series of layers in the neural network) are activated by increasingly larger features in the portion of data being classified. As an example, where the data comprises an image, lower layers in the neural network are activated by small features (e.g. such as edge patterns in the image), mid-level layers are activated by features in the image, such as, for example, larger shapes and forms, whilst the layers closest to the output (e.g. the upper layers) are activated by entire objects in the image.

In general, the weights of the final layers of a neural network model (known as the output layers) are most strongly dependent on the particular classification problem being solved by the neural network. For example, the weights of outer layers may heavily depend on whether the classification problem is a localization problem or a detection problem. The weights of lower layers (e.g. input and/or hidden layers) tend to depend on the contents (e.g. features) of the data being classified and therefore it has been recognized herein that the weights in input and hidden layers of neural networks processing the same type of data may, with enough training, converge towards the same values over time, even if the outer layers of the models are tuned to address different classification problems.

Figure 2:
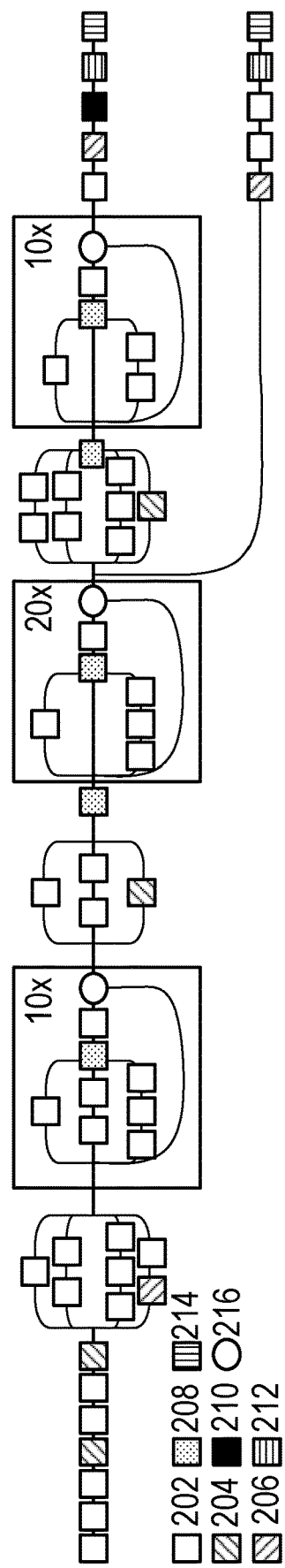
FIG. 2 is a schematic illustration of an example of a predictive model for use in accordance with various embodiments disclosed herein.

In some examples, the predictive model may comprise a convolutional neural network trained to determine whether or not the identified region of interest is indicative of a hemorrhage event. Such a predictive model may be trained on features relevant to a hemorrhage, such that the predictive model can identify a region in which a hemorrhage has occurred, or a region of the brain which has been affected by a hemorrhage, even though a human observer (e.g. a radiologist) might not immediately be able to determine the occurrence of my hemorrhage from simply looking at the image data. In one particular example, a convolutional neural network model known as Inception-ResNet may be employed as the predictive model. The Inception-ResNet model includes around 780 layers, and a compressed representation of the model is shown, schematically, in FIG. 2. The model 200 shown in FIG. 2, includes blocks representing convolution layers 202, max pooling functions 204, average pooling functions 206, concatenation function 208, a dropout function 210, a fully connected layer 212, a softmax function 214, and residual network layers 216. Other examples of models suitable for use in the methods disclosed herein may include fewer or additional layers and/or functions.

Figure 3:
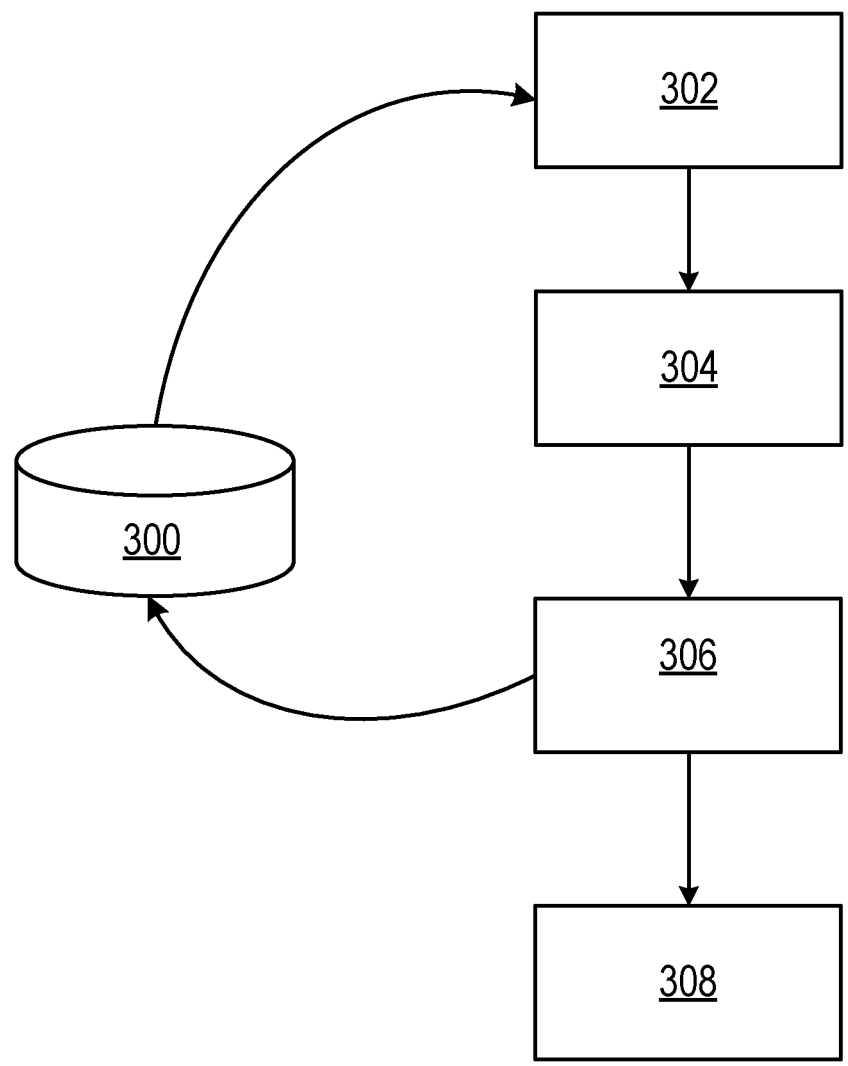
FIG. 3 is a flowchart of an example of a process performed in accordance with various embodiments disclosed herein.

Examples of an image data processing method that may be performed in order to aid detection and/or characterization of stroke in the medical image data acquired in respect of a subject are now discussed with reference to FIGS. 3 and 4. FIG. 3 is a flowchart of an example workflow that may be performed in respect of three-dimensional image data acquired in respect of a subject. The three-dimensional image data may comprise a three-dimensional CT volume of a subject's head. For example, a subject may suffer symptoms indicative of a stroke and, therefore, may be referred to a medical facility (e.g. a hospital) for further investigation. The head of the subject may be scanned using an imaging modality, such as non-contrast CT. Three-dimensional image data (e.g. a 3D CT volume) typically includes a series of slices of image data acquired in a plane (e.g. the axial plane, the coronal plane and/or the sagittal plane), and processing of the three-dimensional image data generally comprises processing each of the slices in turn. Thus, in the workflow shown in FIG. 3, three-dimensional image data 300 comprises a plurality of slices of image data. At block 302, an $i^{th}$ slice of the plurality of slices is read. At block 304, the $i^{th}$ slice undergoes pre-processing, discussed in greater detail below and, once the $i^{th}$ slice has been pre-processed, the workflow continues to block 306, where the next $(i+1)^{th}$ slice is obtained from the three-dimensional image data 300 for processing. Thus, upon completion of the pre-processing of a slice of image data, the workload involves acquiring the next slice, and the workflow returns to block 302.

The workflow continues until all of the slices containing image data relating to the subject's brain have been pre-processed. An example of a stopping criterion, which is considered to be met once all of the image slices containing image data representing the brain have been processed, is discussed below. Once all of the relevant slices have been processed, the workflow proceeds to block 308, where a two-dimensional image is generated based on the pre-processed image data. In some examples, multiple two-dimensional images may be generated, as discussed below. The two-dimensional image(s) may then be provided as an input to a trained predictive model for analysis, which may include identifying and/or characterizing a region of interest indicative of a stroke.

Figure 4:
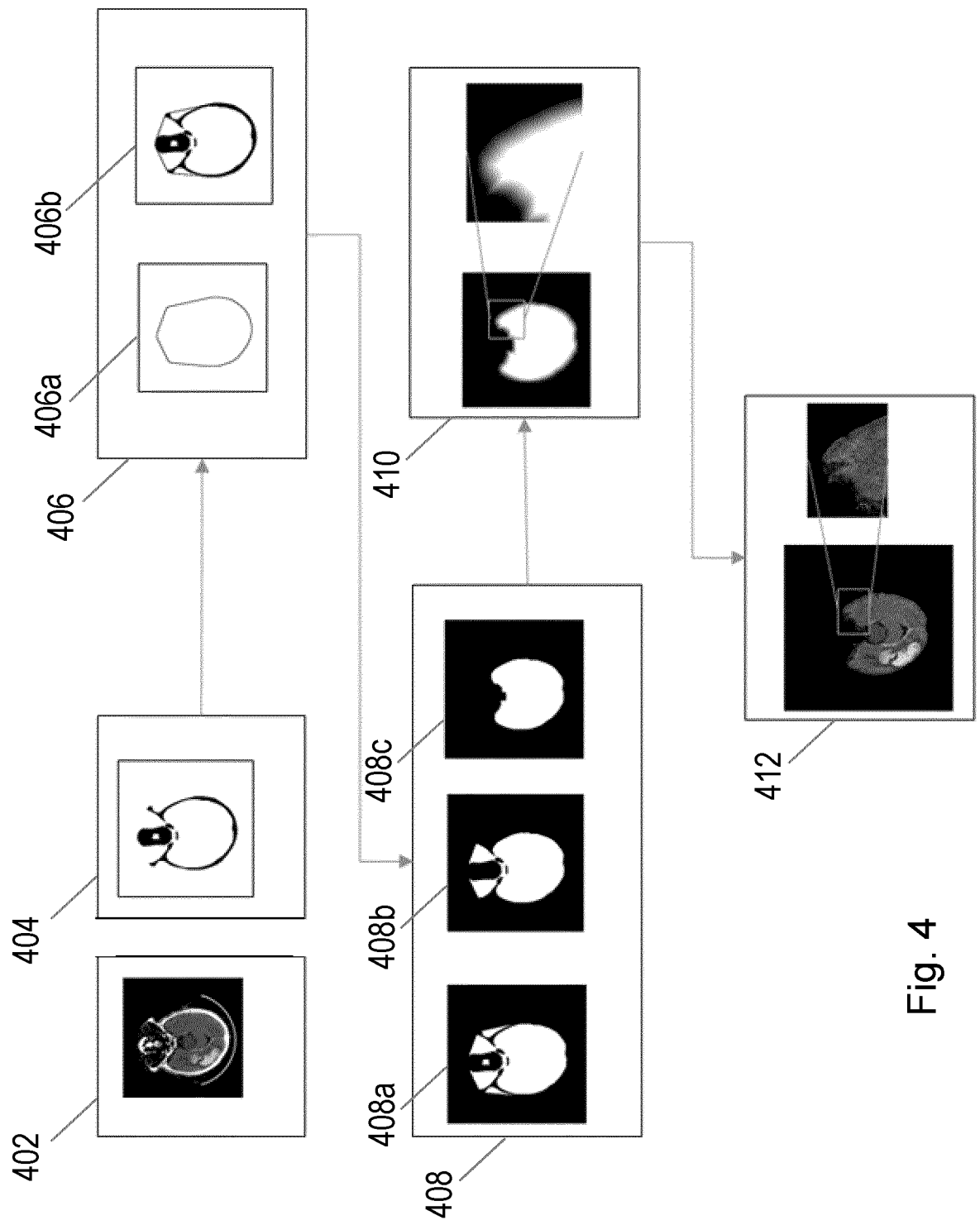
FIG. 4 is a flowchart of a further example of a process performed in accordance with various embodiments disclosed herein.

FIG. 4 is a flowchart showing an example of various processes that may form part of the pre-processing of each slice of the three-dimensional image data (e.g. in block 306 of FIG. 3). In general, the pre-processing may include identifying (block 402) a region within a slice of image data representing bone (e.g. the skull) of the subject, generating (block 404) a mask for the identified bone region, identifying (blocks 406 and 408) the portion of the mask corresponding to the portion of bone encapsulating the subject's brain, performing an adjustment (block 410) of the image data to compensate for effects of radiation scattered from the bone while the three-dimensional image data was acquired, and extracting (block 412) from the image data the portion of image data representing the user's brain. In some examples, just the scattered radiation compensation adjustment (block 410) may be performed during pre-processing of the image data. In other examples, one or more other processes discussed herein may also be performed.

To aid with the identification of bone within the image data, pre-processing of the image data may first comprise registering or aligning the three-dimensional image data with a reference representation (e.g. image or volume) in order to achieve an intended orientation of the image data, and to ensure consistency between the orientation of the slices of image data. The registration of the three-dimensional image data is performed in respect of the three-dimensional volume, including all of the captured slices of image data. In other words, registration is performed in respect of the volume of image data as a whole, rather than in respect of each of the slices individually. In some embodiments, registration of the image data may comprise a non-rigid registration of the image data to a three-dimensional representation of a human brain, for example using an anatomical atlas. Registration of the image data to the anatomical atlas may be achieved using a plurality of fiducials landmarks, where each landmark comprises a feature in the brain, such as a ventricle or the cerebellum.

In some embodiments, identification of fiducial landmarks in the image data used in the registration process may be achieved using machine learning techniques, such as a trained predictive model. For example, an artificial neural network or a support vector machine may be used. The predictive model may be trained on one or more features, such as pixel intensity, entropy, grey level co-occurrence matrix (GLCM), and texture features. For example, the predictive model may determine that a region of interest within the three-dimensional image data is likely (to within a defined threshold of certainty) to represent a particular anatomical structure within the brain. When a region of interest is detected in the image data, each voxel falling within the region of interest is classified as falling within a particular anatomical category (e.g. each voxel within the region of interest may be labelled with an identifier, such as the name as the anatomical structure to which it relates). A voxel may be considered to fall within the region of interest if it falls within a sphere of a defined radius formed around the center of the region of interest.

When classifying a particular voxel as forming part of a region of interest, a majority voting process may be performed, such that once all of the voxel is within a particular region of interest have been labelled as forming part of that region of interest, the majority-voted label is assigned to the region of interest. Multiple labelled regions of interest are then aggregated to define a unique fiducial landmark (e.g. formed of a set of individual fiducial landmarks), which is used for registering and aligning the image data with the reference representation (e.g. from an anatomical atlas).

The registration process discussed above may be performed using the processor 102. Thus, in some embodiments, the processor 102 may be configured to register of the image data to a three-dimensional representation of a brain using a plurality of fiducial landmarks common to the image data and the three-dimensional representation. In some examples, as discussed above, the plurality of fiducial landmarks may be identified using a trained classifier or predictive model.

While registering the image data with a reference representation is helpful to ensure that the image data is suitably aligned for further processing, the registration process is not essential and may, therefore, be omitted from the processing procedure.

As noted above, the registration of the image data is performed using the entire three-dimensional volume. However, the processes in blocks 402 to 412 of FIG. 4 are performed in respect of individual slices of image data. Typically, processing of the slices of image data is performed using axial slices (i.e. slices through the axial plane of the subject's head). However, it will be appreciated that, in some examples, processing may be performed in respect of slices of image data through other planes (e.g. through the coronal or sagittal planes). The images shown in the blocks of FIG. 4 are merely examples showing how the images may change as the preprocessing is performed.

In order to remove those portions of image data that are not to be used in the analysis process, various bone-skull-stripping techniques—which will be familiar to those skilled in this field—may be used. In block 402 of the flowchart in FIG. 4, those regions within a slice of image data representing bone are identified. In one embodiment, the bone regions within the image data may be identified using machine learning techniques, such as a predictive model trained to identify parts of the image data representative of bone. In some embodiments (and as part of the machine learning techniques), bone regions in the image data may be identified by analyzing the structure pattern of the bone (e.g. the skull) in the image data. Boundary parameters and/or intensity values of the image data may be taken into account to determine part of the image representing bone. In addition, one or more filters may be applied to identify and/or extract bone regions from the image. For example, a filter may be applied to remove parts of the image falling outside a defined range on the Hounsfield scale. The Hounsfield scale is a quantitative scale used to describe radiodensity. Thus, in one example, pixels corresponding to regions having a Hounsfield Unit (HU) measure falling outside a range of 0 to 100 may be removed from the image data. It is understood that regions within the range 0 to 100 HU represent regions of blood and brain tissue, which are to remain in the image data.

Once the bone regions have been identified, a mask for the identified region is generated (block 404 of the flowchart in FIG. 4). The mask is generated based on a deformable model, using a simplex mesh. Properties of simplex meshes make them suitable for a range of image segmentation tasks. A generic mesh is provided, and deformed to align with the skull-brain interface; i.e. the inner boundary of the bone regions identified in the slice of image data. The mesh is then geometrically modified using an affine transformation, by minimizing the sum of the square of the distance between the mesh vertices and the bone regions in the image data. The mesh may then deformed using a rough-segmented image (i.e. the image as segmented using the anatomical landmarks), and further using the original image data. The resulting modified mask is intended to capture all of the bone/skull contained within the slice of image data, as shown in the example in block 404.

As will be apparent from the example shown in block 404, the generated mask includes a region that represents the portion of the skull that encapsulates the subject's brain, along with other regions that represent other portions of the skull, such as the eye sockets and/or the jaw. Thus, at block 406 and 408 of the flowchart in FIG. 4, the pre-processing involves identifying the portion of the mask that corresponds to the part of the bone that encapsulates the subject's brain. At block 406, a contour line 406a is formed around the entire bone region. In some examples, the contour line 406a may be formed using Bresenham's line algorithm based on convex boundary points of the skull. As shown at 406b, the contour line encloses the identified bone region in the slice of image data.

At block 408, the region within the mask that corresponds to the subject's brain is extracted. To achieve this, those regions of the mask that corresponds to eye sockets and/or the jaw of the subject's skull may be removed. In some embodiments, this may be achieved by 'flood filling' (i.e. extracting) those regions falling outside of the contour line 406a, as shown, for example, in image 408a. In order to remove the smaller portions of the mask that are not representative of subject's brain region, connected component analysis may be used. In this regard, connected component analysis involves identifying the largest connected component within the mask; in other words, the part of the mask having the largest number of connected (i.e. contiguous) pixels is identified. Those portions of the mask do not form part of the largest connected component are removed or disregarded. The largest connected component is shown in image 408b, and includes a region corresponding to the subject's brain and regions corresponding to the subject's eye sockets.

In order to remove those portions of the mask that correspond to the subject's eyes sockets, morphological erosion and/or morphological dilation operations may be performed. In some embodiments, a morphological erosion operation (with a structuring element $S_e$) may be performed, followed by a morphological dilation operation (with a structuring element $S_d$), where $S_d > S_e$. Following the morphological erosion and dilation operations, a morphological 'AND' operation is performed with the original interior mask (i.e. the mask before any morphological operations have been performed), $I_{mask}$, to preserve the boundary of the brain in the mask. The 'AND' operation may be defined as: $and(((I_{mask} \ominus S_e) \oplus S_d), I_{mask})$. The resulting mask, as shown in image 408c, includes only that portion corresponding to the subject's brain, and may be referred to as a brain mask.

The identifying of the portion of the mask corresponding to the portion of bone encapsulating the subject's brain (blocks 406 and 408 of FIG. 4) may be performed by the processor 102 of FIG. 1. The processes described above may be considered to identify boundary of the subject's brain (e.g. the boundary between the brain and the skull). Thus, the processor 102 may, in some embodiments, be configured to identify a portion of the image data corresponding to a boundary of the subject's brain by, for each of a plurality of successive slices (e.g. axial slices) of the image data: applying a mask to remove the region of the image data corresponding to bone; defining a boundary around the region of the image data corresponding to bone; identifying, within the bounded region, a sub-region of the image data having the largest number of contiguous pixels; and determining that the identified sub-region of the image data corresponds to the subject's brain.

Once the brain mask has been created or generated, radiation scatter compensation may be performed, at block 410 of the flowchart FIG. 4. As noted above, during imaging (e.g. CT scans), electromagnetic radiation (e.g. x-rays) are directed at the object being imaged (e.g. the subject's head). Bone within the subject (e.g. the skull) may cause the electromagnetic radiation to be scattered, and this scattering may be visible in the resulting image data. Scattered radiation may manifest itself as relatively bright (e.g. high pixel intensity) patches in the image data and, in some cases, these bright patches may resemble a hemorrhage event. Thus, a bright patch in the image data caused by radiation scattering from bone could be misconstrued as a hemorrhage event and, as such, a subject could be misdiagnosed as having suffered a hemorrhage (i.e. a stroke), leading to a false positive diagnosis. A correction or adjustment may be made in the image data to compensate for the effects resulting from the radiation scattered from bone during acquisition of the image data.

Figure 5:
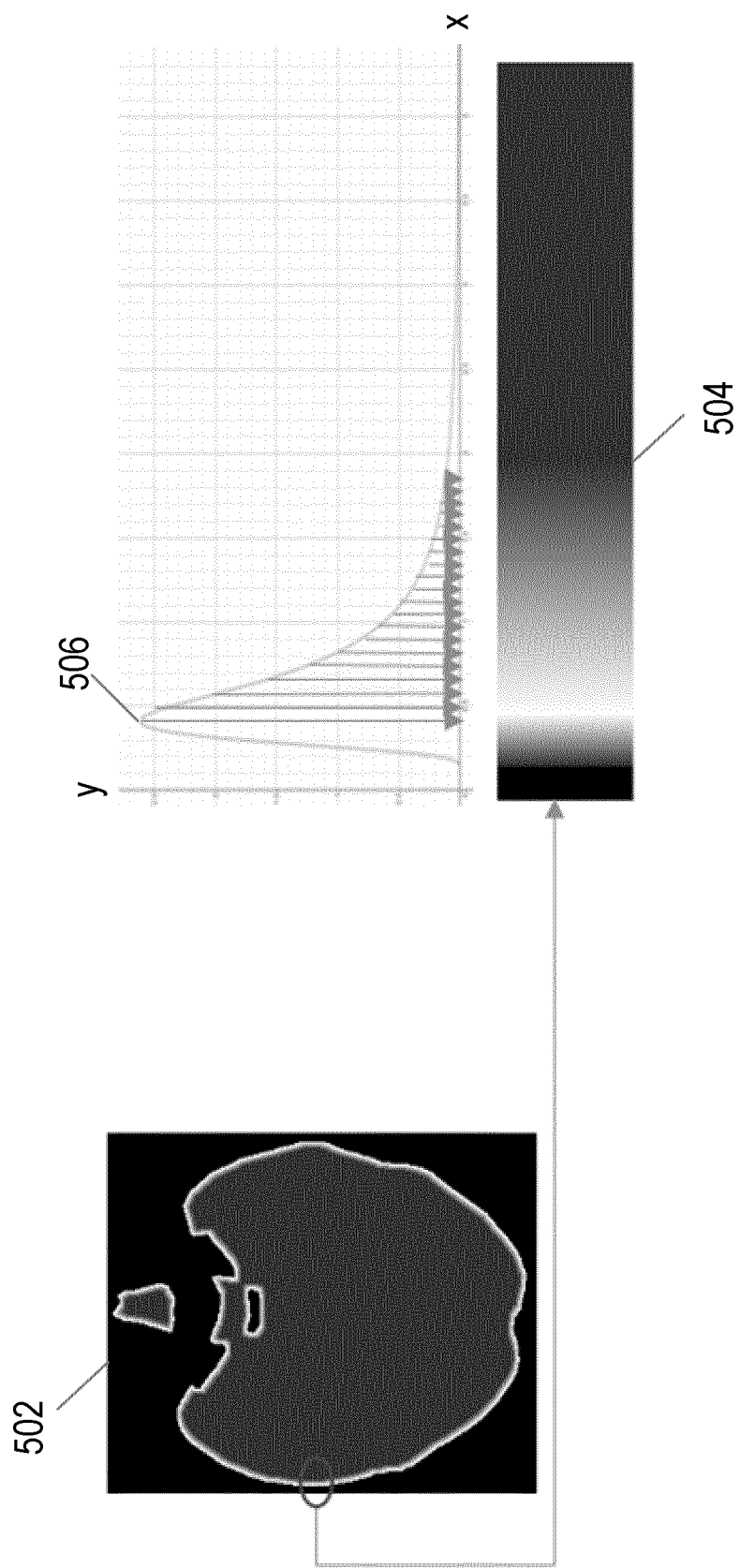
FIG. 5 is an illustration showing effects of radiation scattering.

To compensate for radiation scattering from the bone, a scatter profile may first be determined. The scatter profile defines the variation in pixel intensity in image data is a function of a distance from the surface of the bone from which the radiation is scattered. In the present example, the scatter profile is defined in terms of the change of intensity as a function of the distance from the inner surface of the subject's skull, towards the brain (i.e. the intracranial space. FIG. 5 shows an example of scatter profile for radiation scattered from the inner surface of a skull. In FIG. 5, an image 502 of a slice of image data includes a region within the inner surface of the skull where an increase in pixel intensity has resulted from radiation scattered from the skull during image acquisition. The pixel intensity decreases gradually from high (at the skull region) to low (at the brain region), due to the radiation scattering. The increased pixel intensity is shown in an enlarged image 504 of a portion of the image 502. The graph 506 shows how the pixel intensity, y, varies as a function of distance, x (in mm), from the surface of the skull. Specifically, the graph 506 shows a peak pixel intensity at a position corresponding to the skull, with the pixel intensity decreasing in a logarithmic manner with distance from the skull. According to some examples, a logarithmic intensity compensation model may be used which is based on a Maxwell Boltzmann distribution of an increasing entropy system. In such a model, the decay of pixel intensity is modelled with respect to increasing entropy. The increasing entropy may be considered equivalent to the increasing distance from the skull surface into the intracranial space.

In one example, the model defining the pixel intensity, y, as a function of distance, x (in millimeters), from the skull surface may be expressed as:

$$y = \frac{\left(\sqrt{\frac{2}{\pi}} \cdot e^{\left(-\frac{1}{2x^2}\right)}\right)}{x^3}$$ Equation 1

Once the additional pixel intensity resulting from the scattered radiation has been calculated, a correction may be applied to the image data to compensate for the increased pixel intensity. The adjustment or correction may be applied by the processor 102. Thus, in some embodiments, the adjustment applied to the image data may comprise a reduction of a pixel intensity in regions corresponding to regions of the subject's head into which the radiation is scattered from the bone during acquisition of the image data.

Once the radiation scattered compensation part (block 410) of the pre-processing has been performed, the brain mask (i.e. that part of the skull mask corresponding to the region of the subject's brain) may be applied to the image data using known techniques. Any part of the image data falling outside of the brain mask is extracted, removed or disregarded, leaving just the portion of the image data corresponding to the subject's brain. As noted above, the pre-processing discussed with reference to FIG. 4 is performed for each slice of image data. Therefore, the pre-processing procedure has been completed for a particular slice, the next slice in the three-dimensional image data is acquired, and pre-processed in the same way.

The three-dimensional image data may include slices of image data that do not show portions of the brain. The three-dimensional image data also includes image data that correspond to portions of the brain that is unlikely to be impacted by the stroke. For example, one or more slices may have been captured below lower boundary of the brain. For the purpose of identifying regions of interest relevant to stroke characterization, only those slices of image data showing the brain are to be pre-processed and analyzed. Thus, according to some embodiments, pre-processing of slices of image data may stop when a particular stopping criterion has been met. Thus, the processor 102 may be configured to identify a portion (e.g. slice) of the image data corresponding to a lower boundary of the subject's brain. In one example, a determination of whether or not the next slice of image data in a stack/set of image data slices is to be pre-processed may be made based on the proportion of the image data slice that represents the subject's brain. For example, if the amount (e.g. area) of "brain-per-slice" reduces from one slice to the next by more than a defined threshold, then it may be determined that no additional slices are to be pre-processed. In such a scenario, it may be determined that the slice that includes the smaller amount of brain is a slice captured close to the bottom of the brain. This region of the brain is unlikely to be affected by events (e.g. hemorrhage events) related to a stroke and, therefore, pre-processing slices below this region is unnecessary.

In one example, the stopping criterion discussed above may defined as: If $$\frac{i^{th} \text{ slice brain area}}{(i-1)^{th} \text{ slice brain area}} < n,$$

then stop pre-processing at $i^{th}$ slice. n is a defined threshold value, and the value of n may be selected based on the intended accuracy. In some examples, n may be between 0.5 and 0.8. In one example, n=0.7. Put another way, if the amount (e.g. area visible in the slice) of brain per slice in a particular slice is less than 70% of the amount of brain per slice in the slice immediately preceding the particular slice, then the particular slice is the last slice to be pre-processed; otherwise, the next slice in the stack of slices is processed. Any slices that are not to be pre-processed may be considered irrelevant for the purpose of stroke characterization and, therefore removed or disregarded. For example, image data or slices that do not correspond to brain or correspond to brain regions that are unlikely to be affected by events related to stroke can be discarded or disregarded.

By using the above-described stopping criterion, the lower boundary of the subject's brain may be identified within the image data. This may be performed by the processor 102 of FIG. 1. Thus, in some embodiments, the processor 102 may be configured to identify a portion of the image data corresponding to a lower boundary of the subject's brain by: analyzing successive slices of the image data progressing downwards through the head to determine a measure (e.g. an area or volume) of brain visible in each slice; and responsive to determining that a change in the measure of brain visible in a particular slice relative to a measure of brain visible in the slice immediately preceding the particular slice is below a defined threshold, determining that the particular slice includes image data corresponding to a lower boundary of the subject's brain. In some examples, successive axial slices of the image data may be analyzed, progressing downwards through the subject's head.

Once the whole set of relevant slices has been pre-processed (for example using the pre-processing techniques discussed above), a two-dimensional image may be generated based on the processed three-dimensional image data. In one example, a maximum intensity projection (MIP) of the image data may be performed to generate a two-dimensional image. A maximum intensity projection will be familiar to those skilled in the field of image analysis. Applying a maximum intensity projection to a series of slices (e.g. slices the image data representing the brain) involves projecting those voxels with maximum intensity that would intercept parallel rays traced from the viewpoint to the plane of projection. The outputs of the process is a two-dimensional projection or image showing those objects which appear in the image data having the maximum intensity. Thus, by applying the MIP technique, all of the relevant data from the original three-dimensional image data is retained and represented in a two-dimensional image. Significantly, any information in the original three-dimensional image data that may be used to determine whether or not a hemorrhage has taken place is not lost.

In some examples, multiple maximum intensity projections may be performed in order to obtain multiple two-dimensional images. For example, a first MIP may be performed through the axial plane, a second MIP may be performed through the coronal plane, and a third MIP may be performed through the sagittal plane. In the two-dimensional images obtained from the MIP through the coronal plane and from the MIP through the sagittal plane, image interpolation may be performed to compensate the effect of the thickness of the image data slices. For example, in the coronal and sagittal planes, if the slice thickness were to be increased, then when the MIP operation is performed, a discontinuity between the slices may occur. Thus, interpolation is performed to ensure continuity between slices, with a smooth transition.

Thus, the processor 102 (FIG. 1) may, in some embodiments, be configured to generate a two-dimensional image based on the image data by performing a maximum intensity projection of the image data through at least one of a coronal plane, an axial plane and a sagittal plane.

The generated two-dimensional image (or multiple two-dimensional images) can be provided as an input (or inputs) to a predictive model for analysis. As discussed above, the predictive model may be trained to identify a region of interest in the two-dimensional image relevant to stroke characterization. In some embodiments, the processor 102 may be configured to obtain, as an output of the predictive model, an indication of the identified region of interest. For example, an output of the predictive model may include an indication, such as a visual or textual indication, that a particular region in the image data is considered to be a region of interest relevant to the identification and/or characterization of a stroke. The processor 102 may, in some embodiments, be configured to provide the generated two-dimensional image as an input to a predictive model (e.g. the same predictive model or a different predictive model) to determine whether or not the identified region of interest is indicative of a hemorrhage event. If it can be determined either that the image data does not include a region of interest or that the region of interest is not indicative of a hemorrhage event, then it may be concluded that the subject is unlikely to have suffered a stroke and that, therefore, urgent treatment for stroke is not required. On the other hand, if it can be determined that the region of interest is indicative of a stroke-related event, such as a hemorrhage, then appropriate treatment may be administered, improving the long-term health suspects of the subject. Thus, the processor 102 may, in some embodiments, be configured such that, responsive to determining that the identified region of interest is indicative of a hemorrhage event, the processor generates an alert signal. The alert signal may, for example, comprise an audible alert for a visual alert be presented on the user interface 104.

In some embodiments, the processor 102 may be configured to generate a bounding box for presentation around the region of interest in a representation of the brain of the subject. Thus, a bounding box may be drawn displayed around the relevant region of interest on the two-dimensional image or in some of the representation of the subject's brain, so that a human observer (e.g. a medical professional such as a radiologist) is able to identify the location of the region of interest in the brain, relative to other parts of the brain. This may also help to provide a human observer with confidence in the predictive model, as the human observer can verify the accuracy of the output.

In some embodiments, where the three-dimensional image data has been registered to an anatomical atlas as discussed above, knowledge of various anatomical object within the brain may be used to provide more enriched information to a human observer. For example, it may be possible to determine the anatomical part or object closest to the region of interest within the brain. Thus, the processor 102 may, in some embodiments, be configured to provide for presentation an indication of an anatomical part within the brain of the subject corresponding to the identified region of interest. For example, if the region of interest is evidence of a hemorrhage event which has occurred in the cerebellum, then an indication may be provided (e.g. presented) on a representation of the subject's brain indicating the cerebellum as the part of the brain where the hemorrhage has occurred.

A hemorrhage occurring in the brain is sometimes referred to as an intracerebral hemorrhage (ICH). The severity of an intracerebral hemorrhage may be measured and defined using an intracerebral hemorrhage score, or ICH score. In some embodiments, the region of interest identified by the predictive model may comprise a region where a hemorrhage has occurred. In such embodiments, the processor 102 may be configured to calculate, based on an output of the predictive model, a score indicative of the severity of the hemorrhage. The score may, for example, comprise an ICH score. An ICH score may be calculated by allocating points to various factors, such as a Glasgow coma scale (GCS) score, a volume of the intracerebral hemorrhage, the presence of intraventricular hemorrhage (IVH), the subject's age, and the infratentorial origin of hemorrhage. An output of the predictive model may, for example include the ICH volume, an indication of whether or not an intraventricular hemorrhage is present, and an indication of the infratentorial origin of hemorrhage. Other information (e.g. the GCS score and the subject's age) may be provided by a human operator, for obtained from a database or storage medium (e.g. the memory 106) accessible by the processor.

The ICH score may be computed automatically by the processor 102, by mapping all the required inputs to the model, thereby arriving at the ICH score. The processor 102 may, for example, display the ICH score on a display, such as the user interface 104.

Figure 6:
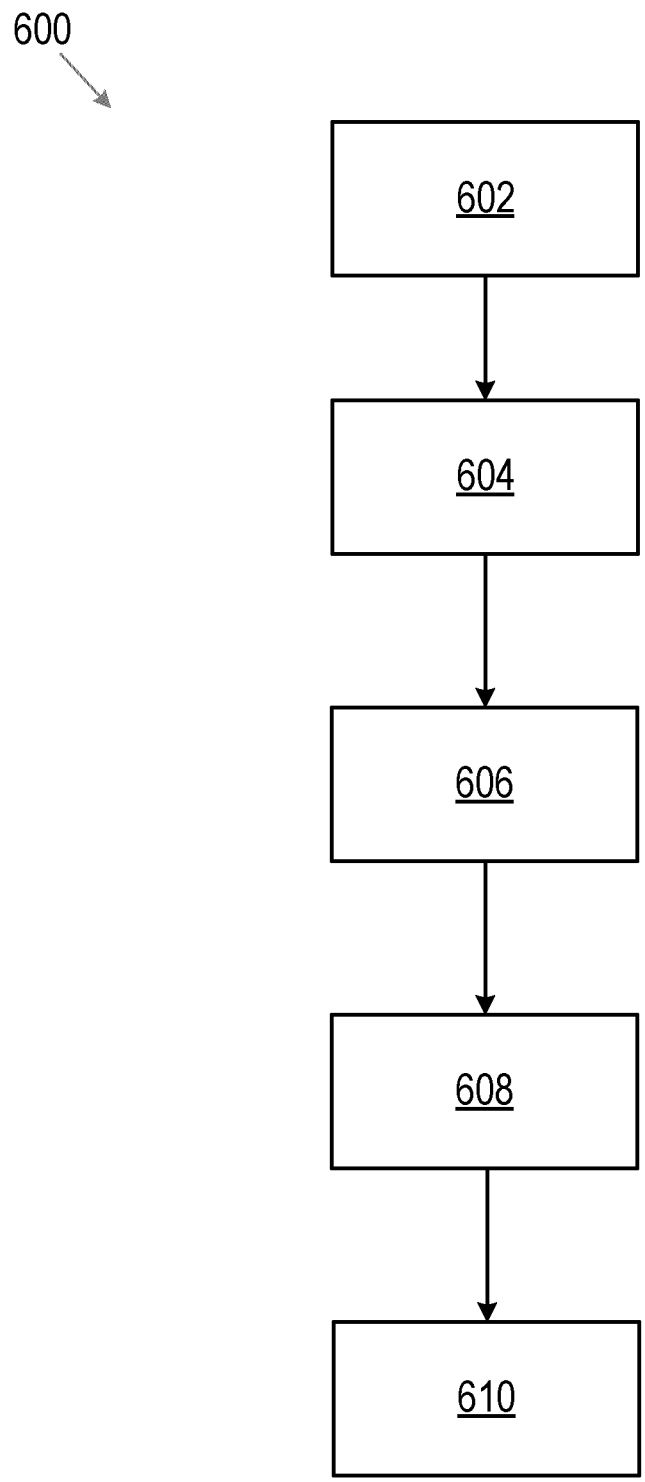
FIG. 6 is a flowchart of an example of a method according to various embodiments disclosed herein.

According to another aspect of the invention, a method is provided. FIG. 6 is a flowchart of an example of a method 600, such as a method for stroke characterization in the medical image data. The method 600 comprises, at step 602, receiving image data representing a three-dimensional image of a head of a subject. The image data may, for example, comprise image data acquired using non-contrast computed tomography (CT) imaging techniques. The image data may be provided manually, for example by a radiologist inputting the image data via a user interface, or automatically, for example by a processor (e.g. the processor 102) obtaining the image data from a storage medium or database. At step 604, the method 600 comprises identifying a region within the image data corresponding to bone in the head of the subject. The indication of bone (e.g. a skull) in the image data may be performed using the techniques disclosed above. The method 600 comprises, at step 606, applying an adjustment to the image data to compensate for effects resulting from radiation scattered from the bone during acquisition of the image data. As described above, the adjustment made to the image data may comprise reducing a pixel intensity pixels in the image data whose intensity has been increased as a result of electromagnetic radiation scattering from bone while the image was acquired. The pixel intensity may, in some embodiments, be adjusted according to equation 1 discussed above. At step 608, the method 600 comprises generating a two-dimensional image based on the adjusted image data. The two-dimensional image may be generated using maximum intensity projection techniques. In some embodiments, multiple two-dimensional images may be generated, for example by performing maximum intensity projections through the axial, the coronal and the sagittal planes. The method 600 comprises, at step 610, providing the generated two-dimensional image (or images) as an input to a predictive model to identify a region of interest for stroke characterization in the two-dimensional image. As discussed above, the predictive model may, in some examples, comprise a convolutional neural network. The predictive model may be trained to identify a region in the subject's brain where a hemorrhage has occurred. Thus, the method may further comprise determining whether or not the identified region of interest is indicative of a hemorrhage event. In some embodiments, the predictive model may provide an indication of the location of the region of interest (e.g. hemorrhage), and additionally other information about the region of interest, such as a volume of the region, an indication of the anatomical part of the brain affected, and/or a score (e.g. ICH score) indicative of the severity of an event (e.g. a hemorrhage) that has occurred.

The method 600 may be performed using a processor, such as the processor 102. Thus, the method 600 may include one or more additional steps that are performed by the processor 102, as discussed above. For example, the method may further comprise identifying a portion of the image data that corresponds to a boundary of the subject's brain. In some examples, the method may further comprise providing, for display, the two-dimensional image and an indication of the region of interest in the two-dimensional image.

Figure 7:
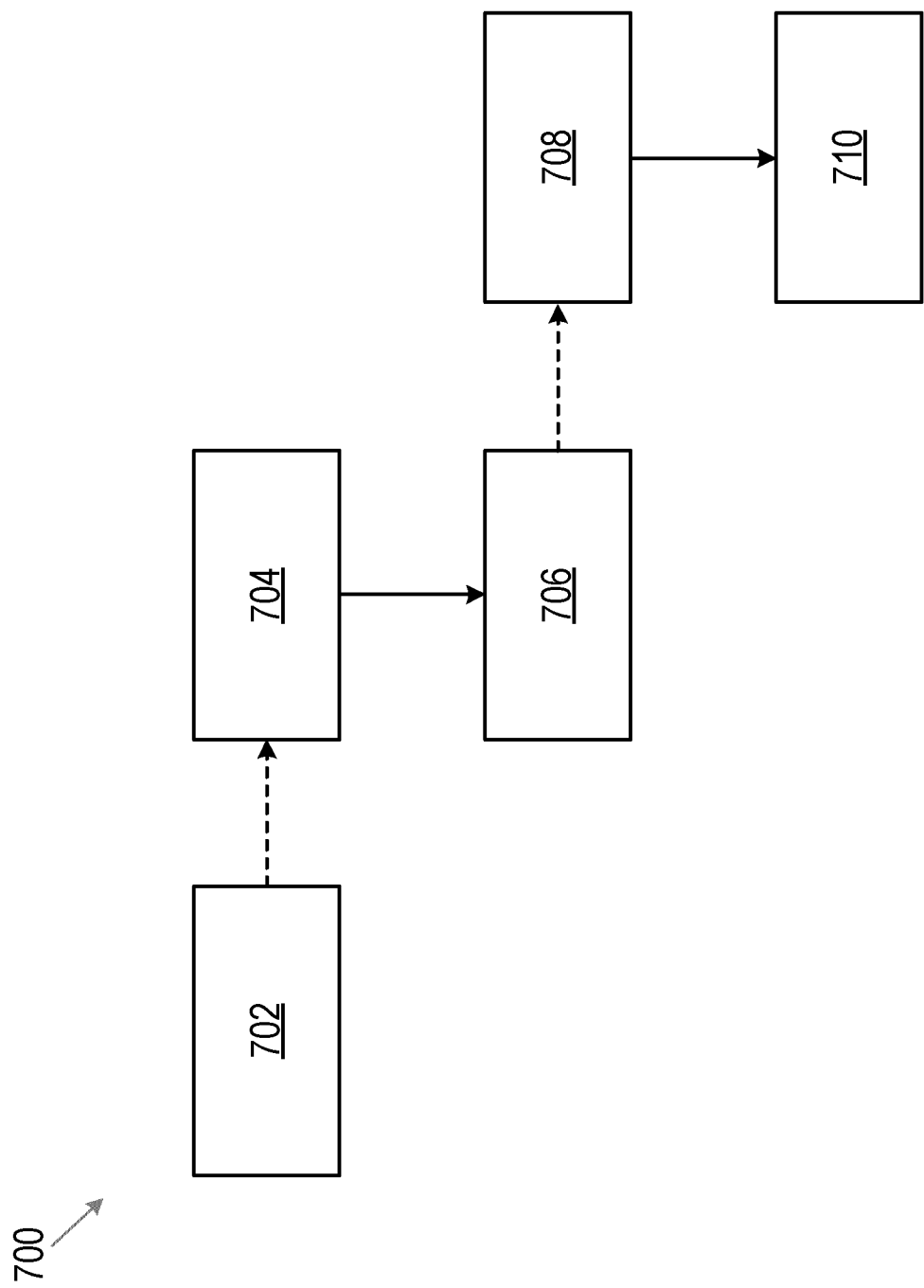
FIG. 7 is a flowchart of a further example of a method according to various embodiments disclosed herein.

So far, the description has focused on the use of a predictive model to identify a region of interest relevant to a stroke. According to another aspect, the invention relates to training a predictive model to identify the region of interest. FIG. 7 is a flowchart of a further example of a method 700, such as a method of processing image data for use in stroke characterization. Processing the image data in accordance with steps of the method 700 may be considered equivalent to pre-processing the image data in the manner described above. The method 700 comprises, at step 702, preparing a training dataset. The training dataset is prepared by receiving image data (step 704) and pre-processing the image data (step 706) for each of a plurality of subjects. Each subject may, for example, comprise a patient who has undergone an imaging procedure to acquire three-dimensional image data. Thus, the training dataset is prepared (step 702) by (each of a plurality of subjects) receiving (step 704) three-dimensional image data representing a subject's head, and pre-processing (step 706) of the three-dimensional image data. The three-dimensional image data is pre-processed (step 706) by applying (step 708) an adjustment to the three-dimensional image data to compensate for effects resulting from radiation scattered from the bone during acquisition of the three-dimensional image data, and generating (step 710) a two-dimensional image based on the three-dimensional image data. Thus, the three-dimensional image data is pre-processed (e.g. in a slice-by-slice manner) as described above, then a two-dimensional image is generated (e.g. using a maximum intensity projection). The generated two-dimensional image for each of the plurality of subjects may then be used to train a predictive model. As noted above, in some embodiments, multiple two-dimensional images may be generated, for example by performing multiple maximum intensity projections through three different planes). In such examples, the predictive model may be trained using the multiple two-dimensional images as inputs.

Thus, the method 700 may further comprise training, using the training dataset, a predictive model to identify in the two-dimensional image a region of interest for stroke characterization. As will be appreciated, the predictive model may be trained on various features, in order to perform an intended task. For example, the predictive model may identify a region of interest, localize (i.e. provide an indication of the location of) the region of interest, providing indication of a size (e.g. a volume) of region of interest, provide an indication of an anatomical part of the brain corresponding to the region of interest and/or provide other information relating to the region of interest. Features/or weights used in the predictive model may be selected according to the intended output to be provided by the predictive model.

EXAMPLE

One specific example is now discussed, in which a predictive model was trained in accordance with embodiments of the invention, and used to provide an indication of a region of interest for stroke characterization, in accordance with other embodiments of the invention.

In this example, three-dimensional image data a plurality of subjects was acquired in the form of a dataset named "CQ 500", obtained from the 'qure.ai' website. The dataset is understood to include non-contrast head CT scan image data, obtained from the Centre for Advanced Research in Imaging, Neurosciences and Genomics (CARING), in New Delhi, India. The image data was acquired using one or more of the following CT scanner models: GE BrightSpeed, GE Discovery CT750 HD, GE LightSpeed, GE Optima CT660, Philips MX 16-slice, and Philips Access-32 CT. The scans were annotated as either relating to a brain in which a hemorrhage has occurred (labelled "hemorrhage") or relating to a brain in which a hemorrhage has not occurred (labelled "non-hemorrhage"), based on evaluations made by three radiologists. Each scan volume contained around 300 slices, with a slice thickness of 0.625 mm.

Each slice of image data was pre-processed using the techniques described herein and, for each scan volume, a maximum intensity projection was performed to generate a two-dimensional image for each subject. The collection of two-dimensional images formed a training dataset used to train the predictive model. The two-dimensional images were provided as inputs to the predictive model having a size of 512×512 pixels, with three color channels. This example, the predictive model used was the Inception-ResNet convolutional neural network model discussed above, and shown schematically in FIG. 2. Initially, a set of "Imagenet" weights were used in the neural network model. The neural network model was trained for 10 epochs, freezing the combination layers. The model was then compiled again, and the entire neural network model was trained for 50 epochs, with a stochastic gradient descent (SGD) optimizer.

In the example, the neural network model was trained using 379 images. The images were rotated by 90° and also flipped vertically, in order to create a training dataset of 1137 images. The accuracy achieved by the neural network model on the training dataset was 0.97, with a sensitivity of 0.95 and a specificity of 0.98. Table 1 below shows a confusion matrix for the output of the neural network model using the training dataset of 1137 images.

TABLE 1 confusion matrix for training dataset

|  | Predicted non-hemorrhage | Predicted hemorrhage |
| --- | --- | --- |
| Actual non-hemorrhage | 649 | 32 |
| Actual hemorrhage | 7 | 449 |

The trained neural network model was tested on a validation dataset containing approximately 52 images (each from a different subject). The images in the validation dataset were pre-processed in a manner similar to the pre-processing performed in respect of the training dataset images. Using the validation dataset, the output of the neural network model and accuracy of 0.96, with a sensitivity of 0.96 and 0.95 specificity. Table 2 below shows a confusion matrix for the output of the neural network model using the validation dataset.

TABLE 2 confusion matrix for validation dataset

|  | Predicted non-hemorrhage | Predicted hemorrhage |
| --- | --- | --- |
| Actual non-hemorrhage | 23 | 1 |
| Actual hemorrhage | 1 | 27 |

From the example described above, it is clear that, by pre-processing the image data in the way described herein, and training a predictive model to identify regions of interest for stroke characterization, the particularly accurate predictive model may be achieved.

According to a further aspect of the invention, a computer program product is disclosed. FIG. 8 is a schematic illustration of an example of a processor 802 in communication with a computer-readable medium 804. According to embodiments of the invention, a computer program product comprises a non-transitory computer-readable medium 804 having computer-readable code embodied therein, the computer-readable code being configured such that, on execution by a suitable computer or processor 802, the computer or processor is caused to perform steps of the methods disclosed herein. The processor 802 may comprise or be similar to the processor 102 of the apparatus 100 discussed above.

The processor 102, 802 can comprise one or more processors, processing units, multi-core processors or modules that are configured or programmed to control the apparatus 100 in the manner described herein. In particular implementations, the processor 102, 802 can comprise a plurality of software and/or hardware modules that are each configured to perform, or are for performing, individual or multiple steps of the method described herein.

Thus, as disclosed herein, embodiments of the invention provide a mechanism for preparing image data so that it can be used to train a predictive model to identify a region of interest relevant for stroke characterization, or be provided as an input to a trained predictive model capable of identifying such a region of interest. By pre-processing the data in this way providing the data as an input into a predictive model has been found to provide particularly accurate results. Specifically, by compensating for radiation scattering within the brain from the inner surface of the skull removes or substantially reduces the likelihood of a region of increased pixel intensity in the image being misconstrued as a hemorrhage.

The term "module", as used herein is intended to include a hardware component, such as a processor or a component of a processor configured to perform a particular function, or a software component, such as a set of instruction data that has a particular function when executed by a processor.

It will be appreciated that the embodiments of the invention also apply to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to embodiments of the invention. It will also be appreciated that such a program may have many different architectural designs. For example, a program code implementing the functionality of the method or apparatus according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the apparatuses and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication apparatus. Any reference signs in the claims should not be construed as limiting the scope.

The invention claimed is:

1. An apparatus for stroke characterization, the apparatus comprising:
    a processor configured to:
    receive image data representing a three-dimensional image of a head of a subject;
    identify a region within the image data corresponding to bone in the head of the subject;
    apply an adjustment to the image data to compensate for effects resulting from radiation scattered from the bone during acquisition of the image data;
    generate a two-dimensional image based on the adjusted image data; and
    provide the generated two-dimensional image as an input to a predictive model to identify a region of interest for stroke characterization in the two-dimensional image, wherein the processor is further configured to:
    identify a portion of the image data corresponding to a boundary of the subject's brain by, for each of a plurality of successive slices of the image data:
    applying a mask to remove the region of the image data corresponding to bone;
    defining a boundary around the region of the image data corresponding to bone;
    identifying, within the bounded region, a sub-region of the image data;
    determining that the identified sub-region of the image data corresponds to the subject's brain.

2. The apparatus according to claim 1, wherein the processor is further configured to disregard portions of the image data that do not correspond to brain or correspond to brain regions that are unlikely to be affected by events related to stroke.

3. An apparatus according to claim 1, wherein the processor is further configured to:
    register the image data to a three-dimensional representation of a brain using a plurality of fiducial landmarks common to the image data and the three-dimensional representation.

4. An apparatus according to claim 1, wherein the identifying, within the bounded region, a sub-region of the image data further comprises:
    identifying, within the bounded region, a sub-region of the image data having the largest number of contiguous pixels.

5. An apparatus according to claim 1, wherein the processor is configured to:
    identify a portion of the image data corresponding to a lower boundary of the subject's brain by:
    analyzing successive slices of the image data progressing through the head to determine a measure of brain visible in each slice; and
    responsive to determining that a change in the measure of brain visible in a particular slice relative to a measure of brain visible in the slice immediately preceding the particular slice is below a defined threshold, determining that the particular slice includes image data corresponding to a lower boundary of the subject's brain.

6. An apparatus according to claim 1, wherein the processor is configured to generate a two-dimensional image based on the image data by:
    performing a maximum intensity projection of the image data through at least one of a coronal plane, an axial plane and a sagittal plane, wherein the image data has been processed to compensate for effects resulting from radiation scattered from the bone during acquisition of the image data.

7. An apparatus according to claim 1, wherein the processor is further configured to:
    obtain, as an output of the predictive model, an indication of the identified region of interest; and
    generate a bounding box for presentation around the region of interest in a representation of the brain of the subject.

8. An apparatus according to claim 1, wherein the region of interest comprises a region where a hemorrhage has occurred, and wherein the processor is further configured to:
    calculate, based on an output of the predictive model, a score indicative of the severity of the hemorrhage.

9. An apparatus according to claim 1, wherein the image data comprises data acquired using a non-contrast computed tomography imaging modality.

10. An apparatus according to claim 1, wherein the predictive model comprises a convolutional neural network trained to determine whether or not the identified region of interest is indicative of a hemorrhage event.

11. An apparatus according to claim 1, wherein the adjustment applied to the image data comprises a reduction of a pixel intensity in regions corresponding to regions of the subject's head into which the radiation is scattered from the bone during acquisition of the image data, wherein the adjustment in the pixel intensity comprises adjusting the pixel intensity based on a distance of the pixel from a surface of the bone.

12. An apparatus according to claim 11, wherein the adjustment comprises adjusting the pixel intensity according to the formula:

$$y = \frac{\left(\sqrt{\frac{2}{\pi}} \cdot e^{\left(-\frac{1}{2x^2}\right)}\right)}{x^3},$$

where y is the pixel intensity, and where x is the distance from a surface of the bone.

13. A method for stroke characterization in medical image data, the method comprising:
  receiving image data representing a three-dimensional image of a head of a subject;
  identifying a region within the image data corresponding to bone in the head of the subject;
  applying an adjustment to the image data to compensate for effects resulting from radiation scattered from the bone during acquisition of the image data;
  generating a two-dimensional image based on the adjusted image data; and
  providing the generated two-dimensional image as an input to a predictive model to identify a region of interest for stroke characterization in the two-dimensional image, wherein the method further comprises:
  identifying a portion of the image data corresponding to a boundary of the subject's brain by, for each of a plurality of successive slices of the image data:
  applying a mask to remove the region of the image data corresponding to bone;
  defining a boundary around the region of the image data corresponding to bone;
  identifying, within the bounded region, a sub-region of the image data;
  determining that the identified sub-region of the image data corresponds to the subject's brain.

14. A non-transitory computer-readable medium storing instructions that, on execution by a suitable computer or processor, cause the computer or processor to:
  receive image data representing a three-dimensional image of a head of a subject;
  identify a region within the image data corresponding to bone in the head of the subject;
  apply an adjustment to the image data to compensate for effects resulting from radiation scattered from the bone during acquisition of the image data;
  generate a two-dimensional image based on the adjusted image data; and
  provide the generated two-dimensional image as an input to a predictive model to identify a region of interest for stroke characterization in the two-dimensional image, wherein the instructions further cause the computer or processor to:
  identify a portion of the image data corresponding to a boundary of the subject's brain by, for each of a plurality of successive slices of the image data:
  applying a mask to remove the region of the image data corresponding to bone;
  defining a boundary around the region of the image data corresponding to bone;
  identifying, within the bounded region, a sub-region of the image data;
  determining that the identified sub-region of the image data corresponds to the subject's brain.

15. The non-transitory computer-readable medium of claim 14, wherein the instructions further cause the computer or processor to:
  prepare a training dataset by, for each of a plurality of subjects:
    receiving three-dimensional image data representing a subject's head; and
    pre-processing the three-dimensional image data by:
      applying an adjustment to the three-dimensional image data to compensate for effects resulting from radiation scattered from the bone during acquisition of the three-dimensional image data; and
      generating a two-dimensional image based on the three-dimensional image data.

16. The non-transitory computer-readable medium of claim 15, wherein the instructions further cause the computer or processor to train, using the training dataset, a predictive model to identify in the two-dimensional image a region of interest for stroke characterization.

* * * * *